(12) United States Patent
Poirot-Crouvezier

(10) Patent No.: US 9,099,697 B2
(45) Date of Patent: Aug. 4, 2015

(54) FUEL CELL COMPRISING MANIFOLDS HAVING INDIVIDUAL INJECTOR SEALS

(75) Inventor: Jean-Philippe Poirot-Crouvezier, St Georges de Commiers (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 129 days.

(21) Appl. No.: 14/116,742

(22) PCT Filed: May 2, 2012

(86) PCT No.: PCT/EP2012/058017
§ 371 (c)(1),
(2), (4) Date: Nov. 8, 2013

(87) PCT Pub. No.: WO2012/152624
PCT Pub. Date: Nov. 15, 2012

(65) Prior Publication Data
US 2014/0080027 A1    Mar. 20, 2014

(30) Foreign Application Priority Data

May 9, 2011  (FR) .................................... 11 53956

(51) Int. Cl.
*H01M 2/38* (2006.01)
*H01M 8/04* (2006.01)
*H01M 8/02* (2006.01)
*H01M 8/24* (2006.01)
*H01M 8/10* (2006.01)

(52) U.S. Cl.
CPC ........ *H01M 8/04156* (2013.01); *H01M 8/0276* (2013.01); *H01M 8/0282* (2013.01); *H01M 8/0284* (2013.01); *H01M 8/0297* (2013.01); *H01M 8/247* (2013.01); *H01M 8/0278* (2013.01); *H01M 8/10* (2013.01); *Y02E 60/50* (2013.01)

(58) Field of Classification Search
CPC ............ H01M 8/0276; H01M 8/0278; H01M 8/0282; H01M 8/0284; H01M 8/0297; H01M 8/04156; H01M 8/10; H01M 8/247; Y02E 60/50
USPC .................. 429/456, 457, 458, 460, 508, 518
See application file for complete search history.

(56) References Cited

U.S. PATENT DOCUMENTS 5,482,792 A    1/1996 Faita et al.
5,532,073 A    7/1996 Hirata et al.
(Continued)

FOREIGN PATENT DOCUMENTS

EP    1677380 A2    7/2006
FR    2887689 A1    12/2006

*Primary Examiner* — Patrick Ryan
*Assistant Examiner* — Ben Lewis
(74) *Attorney, Agent, or Firm* — Baker & Hostetler LLP

(57) ABSTRACT

A fuel cell battery comprises stacked cells, comprising a superposition of plates, called bipolar plates, between which assemblies comprising both an electrolytic membrane and an electrode on each side of the membrane are placed. The plates are provided, on their periphery, with apertures serving to deliver reactive gases, and with apertures serving to evacuate reaction products, the apertures of adjacent plates being aligned in order to form supply or evacuation manifolds that pass right through the stack of cells. The apertures of the manifolds are encircled by individual ring joints that are separated from one another and separate from the bipolar plates, certain joints forming sealing joints between the aperture and a cell, and other joints forming injectors for a fluid to be delivered to a cell or to be evacuated from a cell.

13 Claims, 3 Drawing Sheets

(56) References Cited

U.S. PATENT DOCUMENTS

| | | |
|---|---|---|
| 8,105,727 B2 | 1/2012 | Lemasson et al. |
| 2005/0214620 A1 | 9/2005 | Cho et al. |
| 2009/0130524 A1 | 5/2009 | Goto et al. |
| 2010/0209800 A1 * | 8/2010 | Yamanis et al. ............. 429/457 |

* cited by examiner

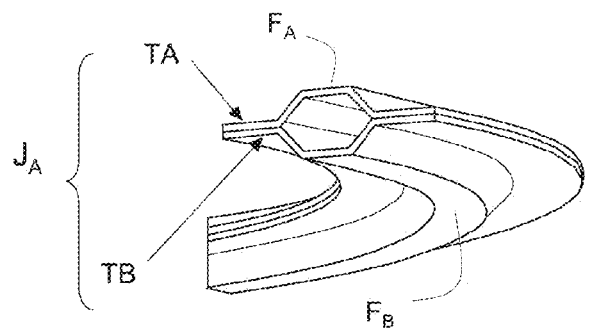
Fig. 4
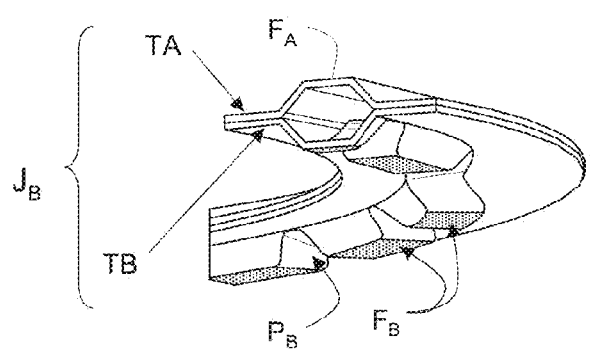
Fig. 5
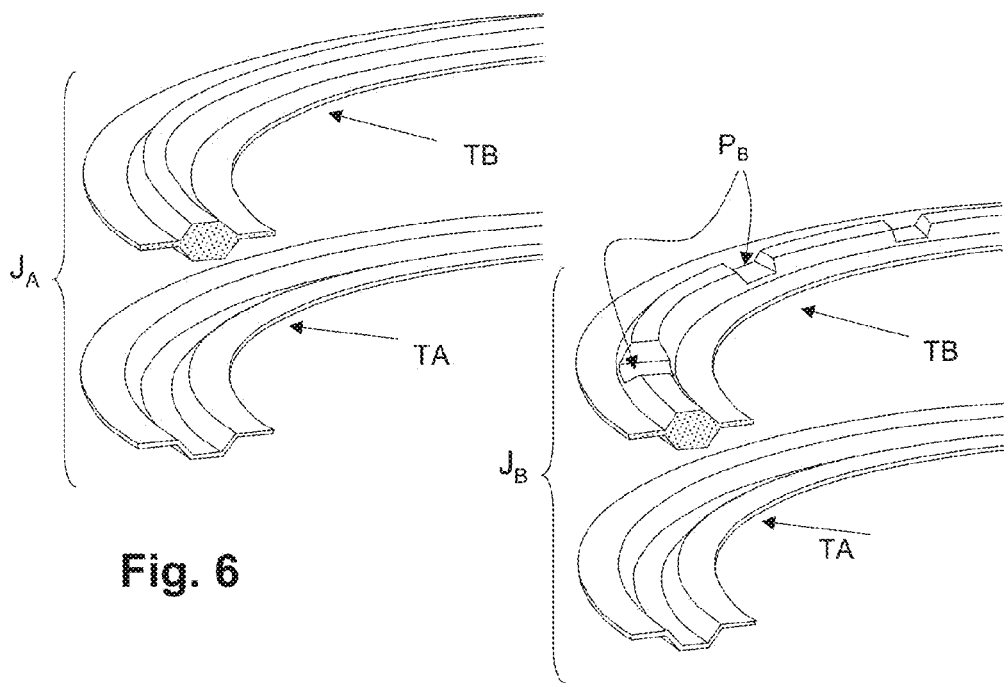
Fig. 6
Fig. 7

FUEL CELL COMPRISING MANIFOLDS HAVING INDIVIDUAL INJECTOR SEALS

CROSS-REFERENCE TO RELATED APPLICATIONS

This application is a National Stage of International patent application PCT/EP2012/058017, filed on May 2, 2012, which claims priority to foreign French patent application No. FR 1153956, filed on May 9, 2011, the disclosures of which are incorporated by reference in their entirety.

FIELD OF THE INVENTION

The invention relates to fuel cell batteries, and in particular hydrogen fuel cell batteries.

BACKGROUND

A fuel cell battery is a stack of elementary cells in which an electrochemical reaction takes place between reactive products that are gradually introduced as the reaction consumes them. The fuel, which is hydrogen in the case of a hydrogen fuel cell battery, is brought into contact with the anode; the oxidant, oxygen or air for a hydrogen fuel cell battery, is brought into contact with the cathode. The anode and cathode are separated by an electrolyte, possibly a solid membrane, that is permeable to certain of the constituents of the reaction but not all. The reaction is subdivided into two half reactions (an oxidation and a reduction), which take place, on the one hand, at the anode/electrolyte interface, and on the other hand, at the cathode/electrolyte interface. In practice, the solid electrolyte is a membrane that is permeable to hydrogen ions $H^+$ but not to molecular dihydrogen $H_2$ or electrons. The reduction reaction at the anode is oxidation of hydrogen producing $H^+$ ions, which pass through the membrane, and electrons, which are collected by the anode; at the cathode these ions participate in the reduction of oxygen, requiring electrons and producing water, heat also being given off.

The stack of cells is only the location of the reaction: the reactants must be supplied thereto, and products and non-reactive species must be evacuated, just like the heat produced. Lastly, the cells are electrically connected in series to one another, the anode of one cell being connected to the cathode of the adjacent cell; at the ends of the stack of cells, on one side an anode is connected to a negative terminal in order to evacuate electrons, and on another side a cathode is connected to a positive terminal. An external circuit is connected to these terminals. Electrons flow from the anode to the cathode via the external circuit thus powered by the battery as the electrochemical reaction progresses.

Conventional fuel cell batteries comprising stacked cells comprise a superposition of what are called bipolar plates, between which are placed assemblies comprising, at the same time, an electrolytic membrane and an electrode on each side of the membrane. The bipolar plates, optionally associated with sealing joints having a particular configuration, serve to collect electrical current and to distribute the reactant gases (hydrogen and air, or hydrogen and oxygen) to the membrane, on the appropriate side of the membrane: hydrogen on the anode side, air or oxygen on the cathode side. They comprise distribution channels facing the anodes and others facing the cathodes. They may also comprise cooling channels. On their periphery, the plates are pierced with apertures serving to deliver the reactant gases, and apertures serving to evacuate the products of the reaction. The apertures for delivering reactant gas form, via the superposition of plates in intimate contact with one another, manifolds for supplying reactant gas. The evacuation apertures form, in the same way, manifolds for evacuating the products of the reaction. Sealing joints are provided so that the fluids remain confined in these manifolds, but the design of the bipolar plates and/or the sealing joints is such that passages are formed in the manifolds in the locations where it is desired to distribute the fluid to a cell so that the fluid penetrates into the cell, on the desired side, without crossing to the other side. These passages direct the reactant gases to the cell via distribution channels formed in the plates, which distribute the gas as uniformly as possible over the electrolytic membrane.

The same applies to the reaction products, the plates and joints being designed in order to allow the reaction products to be gathered and evacuated, on the anode side and/or the cathode side, to the evacuation manifold.

Thus, the supply manifold for supplying a conventional cell with hydrogen consists of a stack of plates and joints designed such that the hydrogen can spread in the cells on the anode side, but absolutely not on the cathode side. The opposite is true for the supply manifold supplying air or oxygen.

At the end of the stack these apertures formed in the plates are respectively connected to a respective supply duct for each reactive product and an evacuation duct for the products of the reaction.

The stack of cells is clamped tight by rods passing through all the bipolar plates and membranes. The exerted pressure seals the cells relative to one another, and creates a seal between the anode side and the cathode side of the cell.

In the prior art, structures have been proposed in which the bipolar plates are cut in a complex way in order to define both the fluid distributing channels and the apertures that, in the superposition of plates, form the supply and evacuation manifolds. The pressure exerted between the plates when they are clamped tightly against one another creates the desired seal in the locations where communication between a manifold and a cell must be prevented (for example there must be no communication between a hydrogen supply manifold and the cathode side of the cell, and no communication between an air supply manifold and the anode side). In the locations where communication must be possible, notches are provided in the bipolar plate.

Patent FR 2 887 689 describes such bipolar plates, which may be made of stamped metal or of other materials such as graphite-filled polymer. But it is not possible in this case for the plates to take the form of a single sheet.

Structures have also been proposed in which a suitably cut plate providing a peripheral seal maintains a seal everywhere where it must be maintained but allows the reactive gas to pass from the manifold into a cell in the locations where it needs to pass. The joint is planar on the electrolytic-membrane side in order to support the latter and it has a more sophisticated shape on the bipolar-plate side. The distribution channels that run from the manifold to the active surface of the membrane may be produced in the seal.

U.S. Pat. No. 5,482,792 describes such a structure. Uniform gas distribution may then be obtained via a foam plate clamped between the peripheral seal and the bipolar plate. The parts of the stack are complex to produce, their cost is high, and they are large in thickness, thereby adversely affecting the compactness of the battery. Lastly, because it must neither be too pliable (in order to allow the channels to be produced) nor too rigid (for the sealing function), the plate forming the complex seal is difficult to produce.

In the above two examples, different bipolar and joint plates are required for the anode side and cathode side of the cells, thereby increasing manufacturing cost.

U.S. Pat. No. 5,532,073 describes injection washers the configuration of which is such that they could not be applied against electrolytic membranes without damaging them.

Publication US 2010/0209800 describes flat joints welded to plates, which joints could not be applied against a flexible electrolytic membrane without damaging it.

SUMMARY OF THE INVENTION

According to the invention, a fuel cell battery comprising stacked cells is provided, the battery comprising a superposition of plates, called bipolar plates, between which assemblies comprising both an electrolytic membrane and an electrode on each side of the membrane are placed, the plates being provided, on their periphery, with apertures serving to deliver reactive gases, and with apertures serving to evacuate reaction products, the apertures of adjacent plates being aligned in order to form supply or evacuation manifolds that pass right through the stack of cells. The apertures of the supply manifolds are encircled by individual ring joints that are separated from one another and separate from the bipolar plates, certain joints forming sealing joints between the aperture and a cell, and other joints forming injectors for a reactive gas to be delivered to a cell or to be evacuated from a cell. The ring joints are formed from at least one nonplanar metal sheet and a complementary part, the metal sheet having a U-shaped cross section in a plane perpendicular to the plane of the apertures, the arms of the U being flared and having ends folded parallel to the bottom, the bottom bearing against the bipolar plate around the aperture or against an electrolytic membrane. The thickness of the joint corresponds to the distance between the bipolar plate and the membrane. The joints forming injectors are provided with local passages in the thickness of the joint in order to allow the fluid to pass, and the joints forming sealing joints are without such passages in order to maintain the seal. The complementary part may be made of metal or polymer, and the passages are formed in the complementary part.

The local passages may preferably be formed by stamping in the case of metal sheets, by moulding (in the case of plastics), or even by cutting.

The expression "ring shape" is understood to mean a closed but not necessarily circular shape. It may be an elliptical or even square or rectangular shape. It will preferably be a circular shape if the apertures are circular.

The U-shaped (or flat-bottomed-V-shaped) cross-section of the sheet is designed in order to well withstand the pressure exerted during assembly of the stack while having a certain flexibility allowing stresses to be distributed. The joint may be applied directly against the electrolytic membrane.

When two sheets having this U shape with flared arms are welded face-to-face, it is via the folded planar portion located at the ends of the arms. The flat bottom of the U of the metal sheet is applied against the bipolar portion. The flat bottom of the U of the other sheet is applied against the electrolytic membrane.

The fluid passages of the injector joints are formed in places in the lateral arms and optionally in the flat bottom of the U, but not in their upper folded planar portions, in order for these portions to preserve an integral annular continuity over the entire periphery of the apertures.

When the complementary part is made of polymer, it fills the bottom of the U of the metal sheet, a planar portion thereof protruding beyond the opening of the U; this planar portion pairs against the bipolar plate or against the membrane. In practice, the complementary part will have an outside shape similar to that of the metal sheet, but will be more bulky since it will fill the entire internal space between its outside surface and the inside surface of the metal sheet.

Preferably, when the complementary part is made of polymer, the fluid passages of the injector joints are local apertures in this part; these apertures are formed, in principle during moulding of the part, in the protruding portion of the part, i.e. protruding beyond the U of the metal sheet.

In the locations where a supply (or evacuation) manifold passes through a cell and therefore, in succession, through an anode region, then through the membrane, then through a cathode region, a joint with passages (injector joint) or a passage-free joint (sealing joint) will be used depending on whether the manifold must communicate or not with the region in question. Thus, for a hydrogen supply manifold, an injector joint will be placed between the bipolar plate and the membrane on the anode side, and a sealing joint will be placed between another bipolar plate and the membrane on the cathode side.

BRIEF DESCRIPTION OF THE DRAWINGS

Other features and advantages of the invention will become apparent on reading the following detailed description, given with reference to the appended drawings in which:

FIG. 4 shows a view of a sealing joint formed from two welded sheets;

FIG. 5 shows a view of an injector joint formed from two welded sheets;

FIG. 6 shows an exploded view of a gas-tight joint formed from a metal sheet and a complementary part made of polymer;

FIG. 7 shows an exploded view of an injector joint formed from a metal sheet and a complementary part made of polymer.

DETAILED DESCRIPTION

Figure 1:
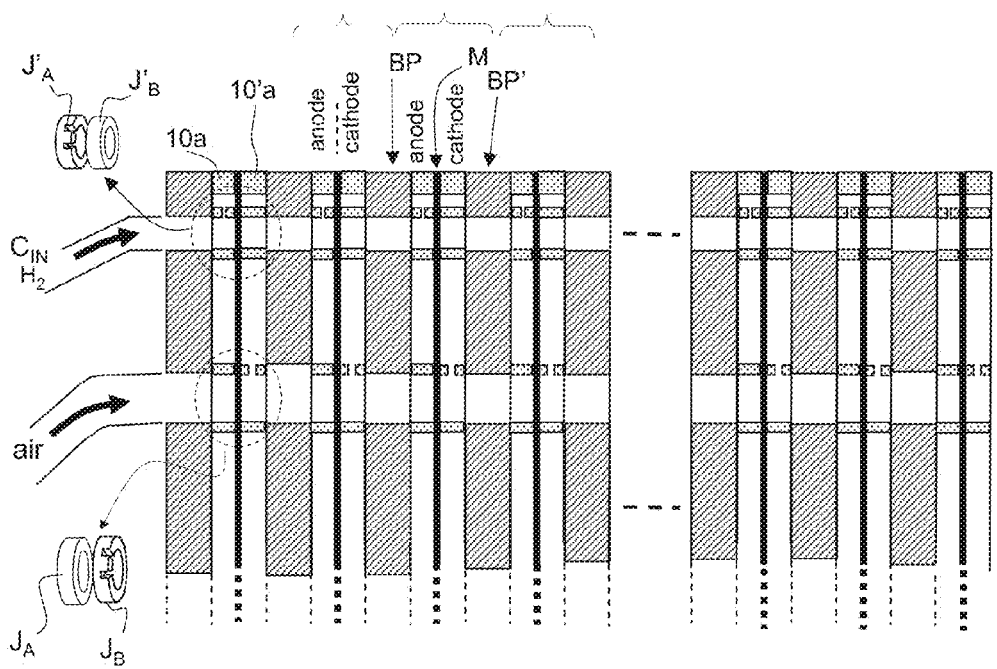
FIG. 1 shows the general principle of a battery according to the invention.

FIG. 1 schematically shows, in cross section, a stack of cells in a hydrogen and air fuel cell battery.

The cells are each composed of a central electrolytic membrane M between two bipolar plates BP and BP'. The anode is placed on the left of each membrane, and the cathode on the right. A plate is common to two adjacent cells. The plates are represented as featureless blocks for the sake of simplicity (the distribution channels that deliver the gases to the active zones are not shown) and only the plate portions containing air and hydrogen supply manifolds (in principle the periphery of the plates) have been shown. The evacuation manifolds are not shown. They may take the same form as the air supply manifolds. Cooling manifolds, which may optionally be present, have also not been shown.

Sealing joints, notably completely gas-tight peripheral joints 10a, 10'a, separate the membrane from each of the bipolar plates.

Aligned apertures drilled in the bipolar plates form the supply manifolds, which manifolds are connected, at the end of the stack, to hydrogen and air supply ducts, respectively.

Between two successive apertures of a given supply manifold formed in two successive bipolar plates, the following are inserted:

- a first ring joint $J_A$ that completely encircles the first aperture and that is clamped between the first plate and the membrane (on the anode side of the membrane); and
- a second ring joint $J_B$ that completely encircles the second aperture and that is clamped between the second plate and the membrane (on the cathode side of the membrane).

The joints support the membrane, holding it in place in the stack.

The joint $J_A$ is a completely gas-tight joint, it prevents reactive gas from passing from the supply manifold to the anode side of the cell (the manifold here being the air supply manifold).

The joint $J_B$ is an injector joint. It, like the joint $J_A$, supports the membrane, but it is not completely gas tight. It comprises passages through which the fluid can pass from the air supply manifold to the cathode side of the cell. These passages are symbolically represented by slits in the periphery of the joints, which slits bring the interior and exterior of the joints into communication. Details of the physical make up of the injector joints will be given below.

The roles of the joints $J_A$ and $J_B$ would of course be reversed for the hydrogen supply manifold: the first joint $J'_A$ is then an injector joint provided with passages to the anode side, and the second joint $J'_B$ is a joint that is completely gas tight with respect to the cathode side.

During assembly of the stack the various parts are pressed against one another by rods (not shown) that pass right through the stack and that comprise appropriate clamping means (threads and nuts). The clamping must be tight in order to correctly maintain the membranes in place, but not too tight in order not to damage the membranes. The clamping force is distributed over all the joints aligned along a supply manifold.

At least one metal sheet and a complementary part will preferably be used to produce the joints; the complementary part may be another metal sheet welded to the first, or a part made of a polymer adhesively bonded to the metal sheet and shaped by moulding in order to have the desired shape. The fluid passages of the injector joints may be formed either in the complementary sheet, by cutting or stamping, or in the complementary part, by stamping, machining, or moulding.

The metal sheets are preferably coated with a polymer layer making it possible, on the one hand, to compensate for manufacturing tolerances in the thickness of the joint, and on the other hand, to electrically isolate the injector from the bipolar plate.

Figure 2:
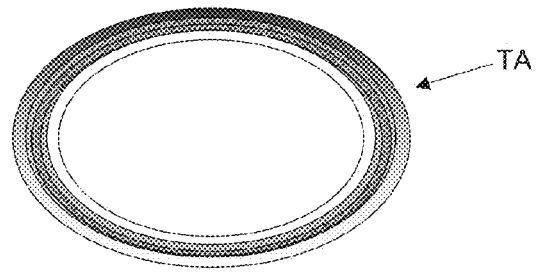
FIG. 2 shows the first sheet of a circular ring-shaped joint composed of two bonded sheets.

The preferred shape of the first metal sheet TA is shown in FIG. 2. It does not comprise passages for the fluid. Its cross section in a radial plane is more easily seen in FIG. 3, which is an enlarged view. The cross section has a U shape with flared arms, which shape could also be called a flat-bottomed-V shape. The bottom of the U is denoted $F_A$, and the arms of the U by $B1_A$ and $B2_A$. The ends of the arms are folded parallel to the flat base of the U. These folds are denoted $R1_A$ and $R2_A$.

FIG. 4 shows a complete sealing joint composed of two identical metal sheets TA and TB welded face-to-face via the folded ends $R1_A$, $R1_B$, and $R2_A$, $R2_B$ of the arms of the flared U. The entire annular surface of the bottom $F_A$ of the U-shaped section of the sheet TA will be applied against the bipolar plate during assembly of the stack, and the entire annular surface of the bottom $F_B$ of the sheet TB will be applied against the membrane.

Figure 3:
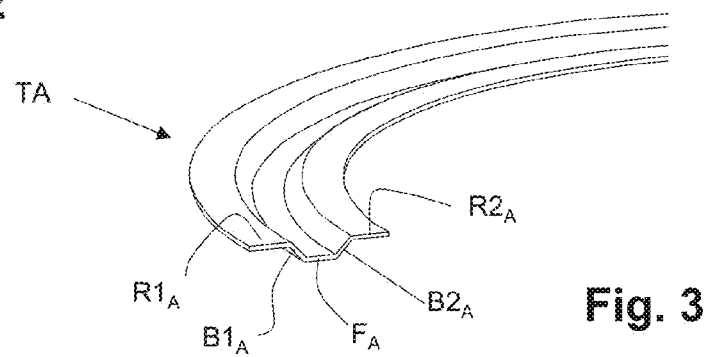
FIG. 3 shows an enlarged view of the first sheet, in which the flared arms of the U-shape of the cross section and the folded ends of the sheet may be seen.

FIG. 5 shows an injector joint composed of two different metal sheets TA and TB, the first sheet TA being identical to that in FIG. 3, the second sheet differing in that it is provided with passages between the interior of the ring and the exterior. The bottom $F_B$ of the U of the sheet TB is discontinuous along the ring instead of being continuous. The passages $P_B$ are formed between the discontinuous bottom zones. They are preferably formed by stamping (if sheet B is a metal sheet), or by moulding (if sheet B is made of polymer). They may also be formed by cutting. Through these passages, the delivered or evacuated fluid may pass between the interior of the joint and the exterior. Here again, the first sheet TA is applied against the bipolar plate. The second sheet TB is applied, via the discontinuous bottom surfaces $F_B$, against the membrane. The passages $P_B$ are preferably formed over the entire height of the arms of the U, excluding however the thickness of the folded parts, which remains continuous over the entire circumference of the joint.

FIG. 6 shows an exploded view of the metal sheet TA and the complementary part TB of a gas-tight joint $J_A$ in the case where this complementary part is made of polymer. The part made of polymer is intended to be adhesively bonded to the metal sheet TA; its outside shape after bonding is the same as that of the sheet TB, but the part is solid and fills the interior of the U of the sheet TA; this solid shape gives it sufficient rigidity.

The radial cross section of the complementary part made of polymer then preferably has a flat-bottomed back-to-back double-U shape the ends of the flared arms of which are folded parallel to the flat base, the space enclosed by the arms of the U being filled with polymer. The folded ends of the U of the complementary part are optional since it is possible to bond the complementary part uniquely to the interior of the U of the metal sheet.

FIG. 7 shows an analogous view to that in FIG. 6, for an injector joint. Passages $P_B$ taking the form of local interruptions in the solid body of polymer are housed in places in the part of the polymer body that protrudes beyond the U of the metal sheet. It is preferable for the passages to be housed in the part made of polymer rather than in the metal sheet.

Figure 8:
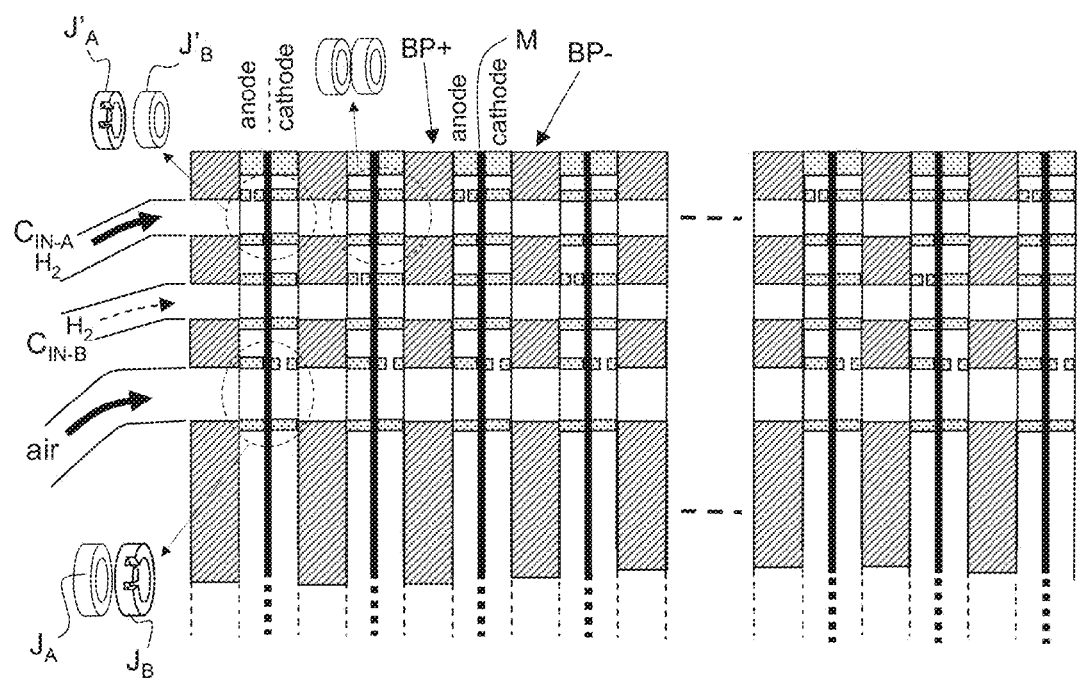
FIG. 8 shows an application of the invention to a multi-manifold injection.

FIG. 8, which in principle is the same as FIG. 1, shows a particularly advantageous application in which the fuel cell battery comprises not one but two hydrogen supply manifolds, each of the manifolds supplying one cell in two of the stack. This means that, if the series of aligned apertures corresponding to the first manifold is considered, one aperture comprises an injector joint between a bipolar plate and a membrane on the anode side, and a sealing joint between the bipolar plate and another membrane on the cathode side, but the following aperture does not comprise an injector joint but two sealing joints around the aperture in order to prevent any supply by the manifold in the location of this aperture. The situation is reversed for the other manifold. In this way one cell in two will be supplied by one manifold and the following will be supplied by the other manifold. The manifolds are supplied by separate exterior ducts $C_{IN-A}$ and $C_{IN-B}$.

This principle may be generalized to N (N>2) hydrogen supply manifolds, supplying one cell in N in the stack with hydrogen: the apertures will be divided into a series of N successive apertures among which one aperture comprises an injector joint between a bipolar plate and a membrane on the anode side, and a sealing joint between the bipolar plate and another membrane on the cathode side, but the N−1 other apertures of the series comprise a sealing joint on each side of the bipolar plate.

Everything just said regarding hydrogen or oxygen or air supply manifolds is also applicable to the evacuation manifolds. Manufacturing cost is reduced because the injector joints are all very similar to the sealing joints, and they both use the same first sheet, the second sheet alone being different but having identical general dimensions (diameter and thickness) in the injector joints and the sealing joints. It is possible for the joints of the supply manifolds and the joints of the evacuation manifolds to be the same.

The invention claimed is:

1. A fuel cell battery comprising stacked cells, comprising a superposition of plates, called bipolar plates, between which assemblies comprising both an electrolytic membrane and an electrode on each side of the membrane are placed, the plates being provided, on their periphery, with apertures serving to deliver reactive gases, and with apertures serving to evacuate reaction products, the apertures of adjacent plates being aligned in order to form supply or evacuation manifolds that pass right through the stack of cells, and the apertures of the manifolds being encircled by individual ring joints that are separated from one another and separate from the bipolar plates, certain joints forming sealing joints between the aperture and a cell, and other joints forming injectors for a fluid to be delivered to a cell or to be evacuated from a cell, wherein the ring joints are formed from at least one nonplanar metal sheet and a complementary part, the metal sheet having a U-shaped cross section in a plane perpendicular to the plane of the apertures, the arms of the U being flared and having ends folded parallel to the bottom, the bottom bearing against the bipolar plate around the aperture or against an electrolytic membrane, the thickness of the joint corresponding to the distance between the bipolar plate and the membrane, the joints forming injectors being provided with local passages in the thickness of the joint in order to allow the fluid to pass, and the joints forming sealing joints being without such passages in order to maintain the seal, the complementary part being made of metal or polymer, and the passages being formed in the complementary part.

2. The fuel cell battery as claimed in claim 1, wherein the complementary part is another U-shaped metal sheet and the two sheets are welded face-to-face via their folded planar portion located at the ends of the arms of the U, the bottom of the U of the metal sheet is applied against the bipolar portion, and the bottom of the U of the other sheet is applied against the electrolytic membrane, the passages of the injector joints being formed in the bottom and the lateral arms of the U, but not in their upper folded planar portions.

3. The fuel cell battery as claimed in claim 2, comprising a hydrogen supply manifold, having, for each aperture in a bipolar plate, an injector joint between a bipolar plate and a membrane on the anode side, and a complete sealing joint between the bipolar plate and another membrane on the cathode side.

4. The fuel cell battery as claimed in claim 1, wherein the complementary part is a polymer part filling the bottom of the U of the metal sheet, a planar portion thereof protruding beyond the opening of the U.

5. The fuel cell battery as claimed in claim 4, comprising a hydrogen supply manifold, having, for each aperture in a bipolar plate, an injector joint between a bipolar plate and a membrane on the anode side, and a complete sealing joint between the bipolar plate and another membrane on the cathode side.

6. The fuel cell battery as claimed in claim 4, wherein the passages of the joints forming injectors are formed in the complementary part made of polymer.

7. The fuel cell battery as claimed in claim 6, comprising a hydrogen supply manifold, having, for each aperture in a bipolar plate, an injector joint between a bipolar plate and a membrane on the anode side, and a complete sealing joint between the bipolar plate and another membrane on the cathode side.

8. The fuel cell battery as claimed in claim 1, further comprising a hydrogen supply manifold, having, for each aperture in a bipolar plate, an injector joint between a bipolar plate and a membrane on the anode side, and a complete sealing joint between the bipolar plate and another membrane on the cathode side.

9. The fuel cell battery as claimed in claim 8, wherein the apertures of the evacuation manifolds comprise, on each side of a bipolar plate, an injector joint provided with notches and a sealing joint without notches, respectively.

10. The fuel cell battery as claimed in claim 8, further comprising an oxygen or air supply manifold, having, for each aperture in a bipolar plate, an injector joint between a bipolar plate and a membrane on the cathode side, and a complete sealing joint between the bipolar plate and another membrane on the anode side.

11. The fuel cell battery as claimed in claim 10, wherein the apertures of the evacuation manifolds comprise, on each side of a bipolar plate, an injector joint provided with notches and a sealing joint without notches, respectively.

12. The fuel cell battery as claimed in claim 1, further comprising N, N being an integer >1, hydrogen supply manifolds, the apertures being divided into N successive apertures among which one aperture comprises an injector joint between a bipolar plate and a membrane on the anode side, and a complete sealing joint between the bipolar plate and another membrane on the cathode side, and the N−1 other apertures comprise a complete sealing joint on each side of the bipolar plate.

13. The fuel cell battery as claimed in claim 12, wherein the apertures of the evacuation manifolds comprise, on each side of a bipolar plate, an injector joint provided with notches and a sealing joint without notches, respectively.

* * * * *